Dec. 6, 1966   K. BREUER   3,289,488
PLANETARY GEAR CONSTRUCTION
Original Filed April 11, 1962   3 Sheets-Sheet 1

INVENTOR
KARL BREUER

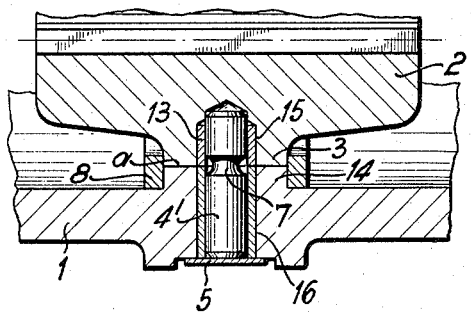
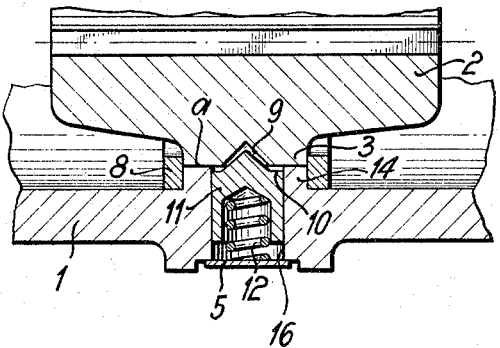
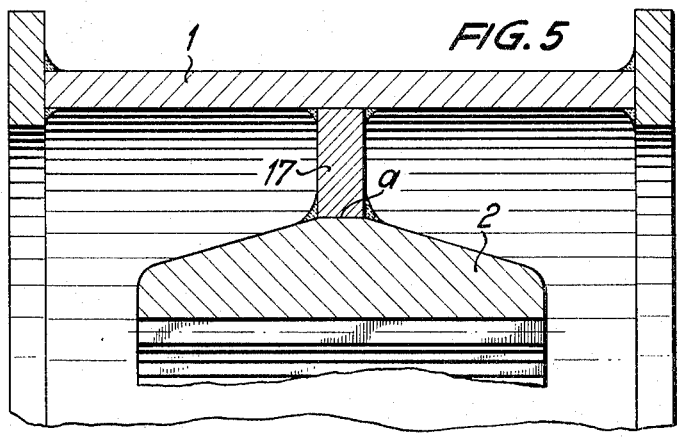

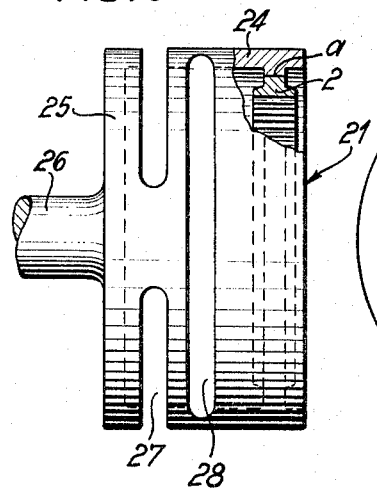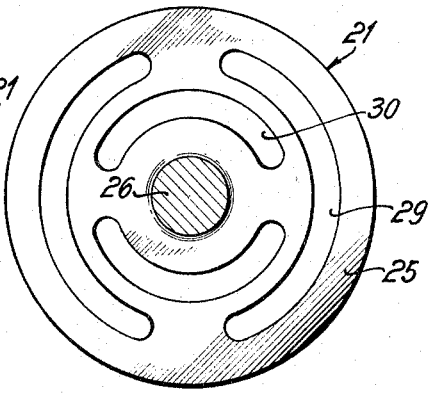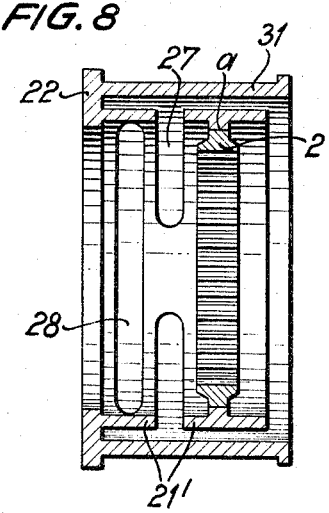

United States Patent Office 3,289,488
Patented Dec. 6, 1966

3,289,488
PLANETARY GEAR CONSTRUCTION
Karl Breuer, Duisburg, Germany, assignor to Demag Aktiengesellschaft, Duisburg, Germany
Original application Apr. 11, 1962, Ser. No. 186,697, now Patent No. 3,244,020, dated Apr. 5, 1966. Divided and this application May 21, 1965, Ser. No. 457,644
Claims priority, application Germany, Apr. 11, 1961, D 35,826
19 Claims. (Cl. 74—410)

This invention relates to a planetary gearing having, as an outer member, an internal ring gear, and, more particularly, to such a planetary gearing including a support for the internal ring gear providing for minor compensating or balancing movements of the latter. This application is a division of my copending application Serial No. 186,697, filed April 11, 1962, for "Gear Construction," now Patent No. 3,244,020.

In recent times, serious efforts have been made, in the gear construction art, to build gears which are lighter in weight and smaller in dimension than the usual prior art constructions. The tendency has been to construct gear assemblies which are operative at a plurality of locations so that a single gear assembly can be active and perform work in various directions and at spaced locations. For example, a single pinion may mesh with two or more gears so that the output may be tapped at spaced locations.

However, as is well known, the tolerances of pinions and gears in general are not exact, and difficulties are encountered in exactly mounting and aligning gears. If a gear is to mesh with several other gears at spaced locations, any misalignment in mounting, or inaccuracy in manufacture, will, of course, affect the operation of the gear assembly. In particular, the driving and driven shafts on which the gears are mounted will operate unsatisfactorily if torque is transmitted to them in an unsymmetric manner, and serious errors with respect to shaft alignment etc. will take place. Thus, any inaccuracy in the original manufacture of the gears and in the mounting of the gears may ultimately lead to destruction and breakdown.

Relatively simple pinions and gears with inclined teeth make it possible to build gear assemblies with smaller dimensions than is possible with gears having arrow or herringbone-shaped gear teeth. Furthermore, such simple gears having inclined teeth are preferred if the gears have to operate at high speed, because axial oscillations are minimized. However, and as is well known in the art, such simple gears have to absorb other axial forces, such as axial stresses and shearing forces. Various constructions have become known in the art in order to minimize tooth contact errors resulting from axial forces. Thus, it has been proposed to construct the connecting shafts or driving shafts for such simple pinions and gears in the form of torsion bar spring shafts in order, by such a construction, to obtain an elastic yielding of the pinions and gears. However, torsion bar spring shafts require a substantial length and, for this reason, gear assemblies wherein the individual gears are mounted on such resilient shafts, have very substantial axial dimensions and are therefore expensive to construct.

It has also been suggested to overcome the last-mentioned drawback by providing yielding or resilient gear couplings, particularly if the available longitudinal dimensions for the gear assembly are short. Thus, driving and connecting shafts have been proposed wherein the gear adjustment is yieldingly effected by means of gear couplings. However, in the case of the mentioned simple pinions or gears with inclined teeth, gear couplings with straight teeth are not suitable, as axial forces such as stresses and shearing forces are not absorbed by the inclined teeth of the pinions and gears. Furthermore, proposals to provide so-called Seeger or other retaining or spring means for the intended purpose have not been successful practically because the provision of such rings makes the gear assembly construction excessively expensive and furthermore causes excessively large pressures on the tooth flanks. In addition, the production of such gearings is extremely difficult and cumbersome, and axial safety rings, which of necessity are required in such constructions, wear out within a short period of time.

One type of gearing train or assembly to which the foregoing discussion is particularly applicable is what is known as a planetary or epicyclic transmisssion or gearing. In epicyclic or planetary gear assemblies, the planet wheels engage either an internal gear stationarily mounted on the gear housing or an internal ring gear which is otherwise stationarily positioned. Despite precision manufacture of the various gear parts and careful assembly, minor defects, such as machining, aligning, or bearing defects, are unavoidable. With the large number of gears involved, these sources of errors add up and result in insufficient contact between the tooth flanks, unilateral wear, high noise development, and poor efficiency.

In the customary stabilizing design, where the housing and the gears are relatively thick walled and solid to resist manifold stresses, the active forces have no other choice but to act, by way of force transfer, at points which lie in the predetermined direction of the force. Thus, the power is transmitted only to stable, unyielding gear parts, particularly, the gears and the housing. It was then determined that a certain elasticity in the construction or mounting of the gears has no harmful effects with respect to power transmission and stress on the parts of the gear assembly. Thus, minor compensating movements are desirable because they permit an automatic balancing of forces. This can be achieved with a slightly elastic construction as compared to the usual rigid construction. In the latter, harmful influences on the contact between teeth are caused by lateral, radial, and tangential forces. With lateral and radial forces in a slightly elastic construction, balancing or compensation takes place in a radial direction, so that tooth contact extends over the entire width even when several sets of teeth are in engagement. To a somewhat lesser degree, the same effect occurs with lateral tangential forces.

However, if the outer internal ring gear is so designed so as to have too large a degree of freedom under sliding friction, other disadvantages and inconveniences result. As a matter of fact, only a very slight elastic adjustability is necessary in order to balance the unavoidable errors.

The invention overcomes the drawbacks of known constructions mentioned above and, for this purpose, provides means effective, on the one hand, to effectively transmit torque from one gear to the other and, on the other hand, to absorb any axial forces which may occur.

Accordingly, an object of the invention is to provide mounting means for the gears of planetary gear assemblies, having different gears at spaced locations, and wherein any inexactness in the production of the gears and/or in the mounting of the gears, is counteracted and compensated.

Another object of the invention is to provide a planetary gearing arrangement including means for absorbing axial forces, such as thrust, stress and shearing forces, without friction or play and with a minimum of counter forces or resistance.

In a known form of planetary gearing, an outer member in the form of an internal ring gear is supported elastically in the housing by means of rubber blocks distributed over the circumference. By this means, there is achieved an elasticity in a radial direction, but this support is not capable of transmitting large torques. In addition, this arrangement is sensitive to oil and heat and susceptible to dynamic shocks. Furthermore, a premature fatigue of the material occurs in this support, so that there is no assurance of long life.

In another known planetary gearing design, the gear assembly is also supported elastically in the housing by means of rubber blocks distributed over the external circumference of an internal ring gear, and pins are used to connect the housing wall with the ring gear. A radial gap or space is left between the housing wall and the outer peripheral surface of the internal ring gear. With this arrangement, a relatively highly elastic support is obtained which, however, does not have too high a torque transmitting capacity. This particular support construction is likewise susceptible to dynamic shocks, because there is no fixed fulcrum. It is too elastic for the purposes of the present invention, because the supporting arrangement has several degrees of freedom due to to the gap and to the rubber blocks.

Accordingly, a further object of the invention is to provide means supporting an outer gear of a planetary gearing, in the form of an internal ring gear, on a housing in such a manner that the rim of the internal ring gear and the support can adjust themselves automatically within narrow limits under the influence of the active forces, and in order to balance the existing error sources due to manufacture and assembly in such a manner that an optimum tooth contact is attained over the entire width of the teeth.

Yet another object of the invention is to provide a planetary gearing including an outer member in the form of an internal ring gear in which the outer peripheral surface of the ring gear bears centrally on an annular surface which is relatively narrow axially as compared to the width of the tooth, this surface being provided on a relatively thin, unribbed hollow cylindrical housing wall whose free cylindrical length is substantially greater, in an axial direction, than the width of the teeth.

Thereby, the internal ring gear bears directly on the housing wall and its outer surface has a firm support on an annular base surface. Furthermore, a fixed fulcrum is provided in which the forces are rigidly absorbed.

With this arrangement, a few hundredths of a millimeter of elasticity provided within a range of the support, and at the points of a planetary gear assembly where the teeth of the planet wheel gears are in contact with the teeth of the internal ring gear, has an effect at the contact surfaces of the teeth such that a maximum tooth contact is achieved over the entire tooth width by this slightly elastic construction. The local action of the forces on the tooth flanks is substantially less than in the customary rigid constructions, because the elastic gear elements permit, relatively rapidly, an automatic elastic balancing or compensating of forces. With this construction, minor balancing movements always occur under the action of centrally or eccentrically acting radial or tangential forces.

In many cases, it is sufficient if the external periphery of the internal ring gear has a mushroom shape or T-shape radial cross section, with the narrow portion of the cross section serving as a web for supporting the internal ring gear on the housing. This increases the natural elasticity of the connection. This may be contrasted with present constructions wherein a connection between the housing and the rim of the internal ring gear by ribs makes automatic adjustability impossible. With forces acting laterally on the internal ring gear, the respective rim zone yields elastically axially because of the relatively short supporting base which, being fixed in an axial direction, acts practically as a fixed fulcrum. In further accordance with the invention, the housing wall can be made thinner outside the supporting surface than at the supporting zone.

In accordance with a further embodiment of the invention, the slightly elastic support of the internal ring gear, serving as the outer member of a planetary gearing, may be provided by making the hollow cylinder, in which the internal ring gear is supported, to be supported unilaterally on a bottom wall. The hollow cylinder and/or the bottom wall are provided with slots extending circumferentially and staggered by 90°.

In this arrangement, as in that just described, the internal ring gear has a bearing on the housing over an axially relatively narrow annular surface, but which is now provided on an elastically designed hollow cylinder having the shape of a cylindrically walled pot. This hollow cylinder also can be arranged in another hollow cylinder to which it is connected, at one end only, by a flange.

The tooth engagement and bearing errors existing in any gear assembly, and the alignment errors caused by the driving and driven shafts with an unsymmetrically introduced torque, are eliminated by elastic support of the external member or internal ring gear providing additional compensating or balancing movements. This compensation takes place substantially in a radial or, in the particular case, in a tangential direction.

A support in the form of an elastic pot, in accordance with the invention, enables the internal ring gear to have, in a certain sense, "wobbling" balancing or compensating movements under the influence of the active forces. This insures a maximum contact on the entire tooth flanks of the meshing gears.

There is a known planetary gear construction utilizing an elastic pot support. However, this construction does not have any central, axially narrow supporting surface for the internal ring gear. A high radial web is provided on the outer periphery of the internal ring gear, which makes radial bending and wobbling balancing movements impossible. In the construction of the present invention, due to the slots in the wall of the pot, the turning and bending elasticity of the pot is increased, and this is utilized to distribute the load to be transmitted evenly over all of the planet gears. Furthermore, the elastic support of the external planetary gearing member, which is an internal ring gear, provides for a universal balancing movement for an elastic balance of forces, a maximum contact of the tooth flanks, and acceptable quietness with low wear by virtue of the existing fixed fulcrum at the supporting zone.

For an understanding of the principles of the invention, reference is made to the following description of typical embodiments thereof as illustrated in the accompanying drawings.

In the drawings:

FIGS. 3 and 4 are views, similar to FIG. 1, illustrating further modifications of the support arrangement shown in FIG. 1;

FIG. 5 is a view, similar to FIG. 3, illustrating another embodiment of the ring gear supporting arrangement;

FIG. 6 is an outside elevation view of an elastically deformable housing for supporting the internal ring gears;

FIG. 7 is an end elevation view corresponding to FIG. 6; and

FIG. 8 is an axial sectional view illustrating a modification of the arrangement shown in FIGS. 6 and 7.

Figure 1:
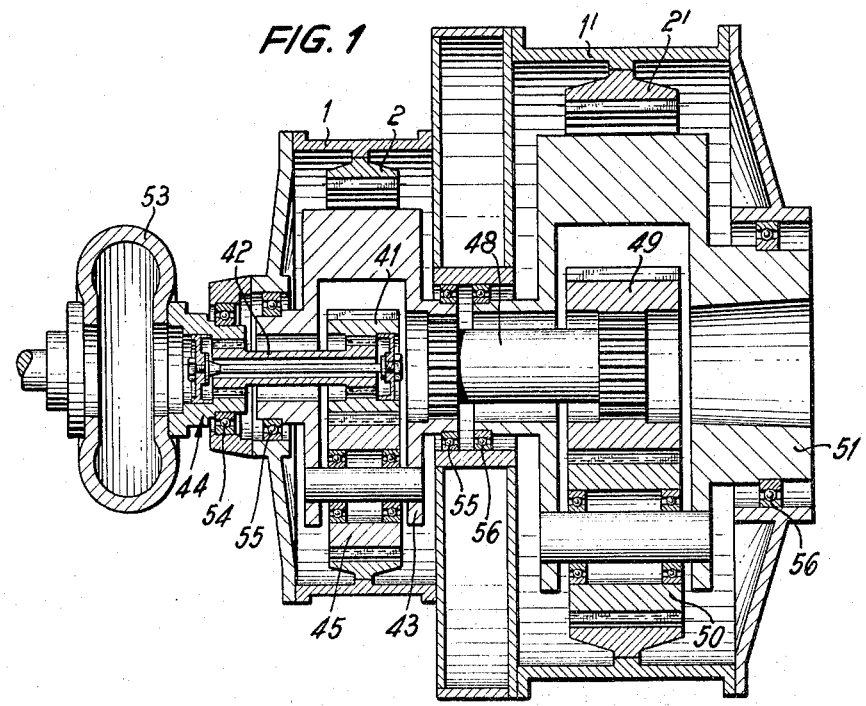
FIG. 1 is an axial cross sectional view through a two-stage planetary or epicyclic gearing which is operative at two locations, i.e. the output is tapped at two locations.

In the planetary gearing illustrated in FIG. 1, the input torque is applied through a flexible coupling 53 to a transmission member or coupling 44. A preferably tubular shaft 42 has one end splined to intermesh with internal splines on the member 44 so as to be rotated therewith, the shaft 42 thus being supported in the member 44 which is, in turn, supported in a bearing 54. Shaft 42, being supported only at one end, may be termed a cantilever shaft which has a free end spaced a substantial distance axially from its supported end. The free end of shaft 42 is splined to interengage with an internally splined sun pinion 41. Due to the relative springiness of shaft 42 by virtue of its support at only one end, pinion 41 has a degree of freedom of movement in a radial direction. Due to its splined interconnection with shaft 42, pinion 41 also has a degree of freedom of axial movement.

Pinion 41 meshes with one or more planet gears 45 rotatably supported in a carrier 43. Carrier 43, in turn, is rotatably supported in bearings 55. Planet gears 45 mesh with an internal ring gear 2, constituting the outer member of the gearing, and having a somewhat yieldable but rotation-preventing connection to a casing portion 1.

The planetary gearing illustrated in FIG. 1 is a double reduction planetary gearing. For this reason, the right-hand end of carrier 43 is internally splined to provide a splined interconnection with the left-hand end of a shaft 48. Shaft 48 also is supported only at its left end so that its right end has a degree of freedom of movement in a radial direction. The right end of shaft 48 is splined to form a splined interconnection between shaft 48 and a second sun gear or pinion 49. Sun pinion 49 likewise has a degree of freedom of movement in a radial direction due to the relative springiness of the cantilever support of shaft 48. Pinion 49 also has a degree of freedom of movement in an axial direction.

Sun pinion 49 meshes with planet pinions or gears 50 which are rotatably mounted in a carrier 51 rotatably supported in axially spaced bearing 56. Planet gears 50 mesh with an internal ring gear 2' constituting an outer member of the planetary gearing and having a yielding but rotation-preventing connection with a casing portion 1'. The output may be derived from carrier 51, although it is known in planetary gearing, to derive the output either from carrier 51 or from one or more of planet gears 50.

It will be noted that each of the sun pinions 41 and 49 is supported upon the free end of a cantilever drive shaft, such as 42 or 48, to which each sun pinion is splined for a degree of freedom of movement in an axial direction in addition to the degree of freedom of movement in a radial direction. It will be noted further that the planetary gearing shown in FIG. 1 is of the type which, due to the internal ring gears being stationary, involves rotation of the carriers for the planetary gears when the sun pinions are rotated. Thus as sun pinion 41 is rotated, planet pinions 45 are rotated and roll around the internal ring gear 46. In turn, this induces rotation of carrier 43 about the axis of shaft 42.

Figure 2:
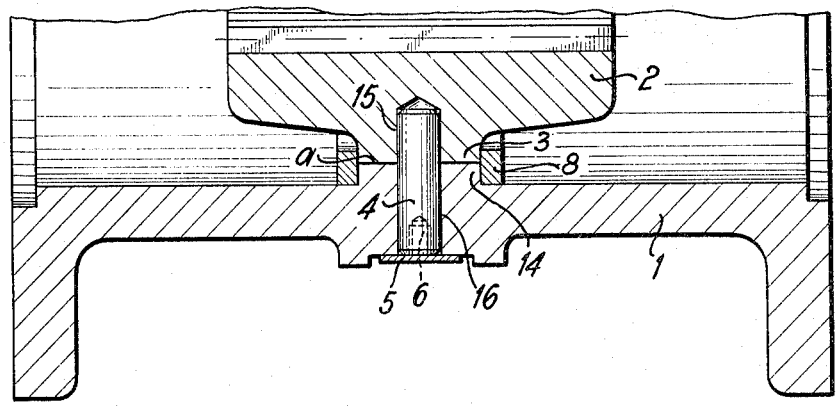
FIG. 2 is a partial axial sectional view corresponding to a portion of FIG. 1 and illustrating one arrangement, in accordance with the invention, for supporting an internal ring gear on a housing.

As stated, internal ring gears 2 and 2' have somewhat yieldable but rotation-preventing connections to casing portions 1 and 1', respectively. As both connections are identical, only one will be described. Referring to FIG. 2, the external periphery of internal ring gear 2 is formed with an axially relatively narrow rib 3 having a cylindrical outer surface engaging the cylindrical inner surface $a$ of an annular rib 14 on the inner surface of casing portion 1. It will be noted that the axial extent of the cylindrical surfaces of ribs 3 and 14 is very substantially less than the axial extent of the tooth of internal ring gear 2, and that casing portion 1 is relatively thin and free of ribs or other reinforcements except at the central portion where it provides support for internal ring gear 2. Furthermore, casing 1 is designed as a hollow cylindrical wall whose axial extent is very substantially greater than the axial extent of the teeth of internal ring gear 2.

Ring gear 2 is formed with a plurality of radial bores 15 which are substantially uniformly spaced circumferentially therearound, open through the outer surface of rib 3, and are aligned on the central diametric plane of ring gear 2. Each of these bores 15 is radially aligned with a corresponding one of a plurality of bores 16 extending through the casing wall portion 1, and centered relative to the axial extent of rib 14. Bending pins 4 are engaged through bores 15 and 16 to serve as means connecting internal ring gear 2 to casing wall portion 1 for transmission of forces from the ring gear to the casing wall portion. Safety locking elements 5 and 6 are provided to maintain pins 4 in position in the bores 15 and 16. The two ribs 3 and 14 are held in alignment by suitable retaining means, such as retaining rings 8 laterally engaging both ribs 3 and 14 and seated on the inner surface of casing wall portion 1. These rings, together with the connecting pins 4, which also absorb the axial thrust due to helical teeth on the gearing, maintain the position of ring gear 2 in an axial direction and hold it in this position.

In the modification of the arrangement shown in FIG. 3, hardened bushings 13 are inserted into the bores 15 and 16, and shear pins 4' provided with reduced cross section breaking portions 7, are inserted into bushings 13. In this arrangement, as in the arrangement shown in FIG. 2, ribs 3 and 14 are maintained against axial displacement by retaining means 8. The split bushings 13 are inserted with a sliding or pressure fit into the bores 15 and 16, and are held in position by a safety locking element 5. If the load on the gearing exceeds the design maximum load, shear pins 4' break and internal ring gear 2 can rotate in housing wall portion 1. Retaining rings 8 prevent canting of the internal ring gear 2 under the action of transmitted torque, so that destruction of these gear elements is avoided. The provisions taken in the arrangement of FIG. 3 are safety measures protecting against overloading of the gearing.

Another arrangement, likewise providing safety against overloading, is shown in FIG. 4. Referring to this figure, the rib 3 on internal ring gear 2 is formed with a plurality of circumferentially equally spaced substantially conical recesses 9 centered with respect to the axial length of rib 3. Each recess 9 has engaged therein the conical or spherical point 10 of a spring pressed bushing 11 designed as a locking element. Plungers or bushings 11, each of which is provided with a lug, are forced inwardly of the centering bores 16 in housing wall portion 1 under the action of springs 12, each seated in a bushing 11 and each having its outer end engaging the retaining means 5. If a harmful overload occurs, plungers 11 act in the nature of a ratchet so that internal ring gear 2 can rotate relative to casing or housing wall portion 1 until the overload disappears. It will be appreciated that the recesses 9, instead of being conical, can be spherical or any other shape providing the desired "ratchet" action in cooperation with the plungers 11.

FIG. 5 illustrates a variation of the connecting means. In FIG. 5, the outer peripheral surface of internal ring gear 2 is formed, at a position disposed centrally thereof in an axial direction, with a peripherally extending cylindrical portion $a$ having an axial extent very substantially less than the axial extent of the teeth of ring gear 2. An axially very narrow and radially very short annular web 17 is welded to internal ring gear 2 and to casing wall portion 1 to serve as a connecting member between gear 2 and casing wall portion 1.

In each of the embodiments shown in FIGS. 2, 3 and 4, there is an axially very narrow cylindrical supporting base $a$, which has an axial extent very substantially less than the axial extent of the teeth of ring gear 2, and furthermore, the casing is provided with a slightly elastic or flexible wall and has an axial extent very substantially greater than the axial extent of the teeth of ring gear 2. The particular arrangement for connecting the relatively narrow surface $a$ to the casing wall section may be selected, as needed, from the several embodiment illustrated in FIGS. 2–5.

In the embodiments of the invention illustrated in FIGS. 6, 7 and 8, internal ring gear 2 is again fixedly connected with the casing wall along an axially very narrow cylindrical surface a having an axial extent very substantially less than the axial extent of the teeth of ring gear 2, with the casing wall portion to which ring gear 2 is connected having an axial extent very substantially greater than the axial extent of the teeth of ring gear 2. Referring to FIGS. 6 and 7, internal ring gear 2 is fixedly connected at the relatively narrow cylindrical portion a with a flexible or elastic substantially hollow pot-shaped cylindrical casing 21 having a hollow cylindrical outside wall 24 and a circular bottom wall 25 from which there projects a bearing or journal portion 26. Cylindrical casing 21 is made elastic or flexible by circumferentially extending slots formed in circumferential wall 24 and/or in bottom wall 25.

Referring particularly to FIG. 6, wall 24 of casing 21 is formed with circumferentially extending slots 27 and 28 extending radially therethrough. Slots 27 and 28 are uniformly staggered circumferentially of wall 24, as by being offset circumferentially by 90°.

FIG. 7 illustrates the slots formed in bottom wall 25. These slots are indicated at 29 and 30 and likewise extend arcuately or circumferentially, the slots 29 and 30 being offset or staggered circumferentially by 90°, for example. These slots extend axially through bottom wall 25. Due to the elastic or flexible nature of casing 21 obtained by the formation of the slots therein, internal ring gear 2 can perform, to a minor extent, wobbling balancing movements.

FIG. 8 illustrated an alternative embodiment of the arrangement shown in FIGS. 6 and 7. In this case, the hollow cylindrical casing 21' in which internal ring gear 2 is fixedly mounted, is arranged within another hollow cylindrical casing 31. The two casings, 21' and 31, are connected to each other at one end by a radial wall or flange 2. The construction shown in FIG. 8 likewise provides for universal mobility of internal ring gear 2.

While specific embodiments of the invention have been shown and described in detail to illustrate the application of the principles of the invention, it will be understood that the invention may be embodied otherwise without departing from such principles.

What is claimed is:

1. In a planetary gearing including a sun gear, a casing, a rotatable carrier, an internal ring gear within the casing and constituting the outer member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; the external periphery of said ring gear having bearing engagement with the inner surface of said casing cylindrical wall over a narrow annular cylindrical contact area constituted by circumferentially continuous, smooth and uninterrupted cylindrical surfaces of said ring gear and said casing cylindrical wall, and which is axially substantially centrally of said ring gear and has an axial extent substantially less than that of the teeth of said ring gear.

2. In a planetary gearing including a sun gear, a casing, a rotatable carrier, an internal ring gear within the casing and constituting the outer member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; the external periphery of said ring gear having bearing engagement with the inner surface of said casing cylindrical wall over a narrow annular cylindrical contact area constituted by circumferentially continuous, smooth and uninterrupted cylindrical surfaces of said ring gear and said casing cylindrical wall on radially extending means disposed axially substantially centrally of said ring gear and having an axial extent substantially less than that of the teeth of said ring gear.

3. In a planetary gearing including a sun gear, a casing, a rotatable carrier, an internal ring gear within the casing and constituting the outer member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; the external periphery of said ring gear having bearing engagement with the inner surface of said casing cylindrical wall over a narrow annular cylindrical contact area constituted by circumferentially continuous, smooth and uninterrupted cylindrical surfaces of said ring gear and said casing cylindrical wall, and which is axially substantially centrally of said ring gear and which has an axial extent substantially less than that of the teeth of said ring gear; one of said continuous, smooth and uninterrupted cylindrical surfaces of said narrow annular cylindrical area constituting the radially outer surface of a central rib on the external periphery of said ring gear.

4. In a planetary gearing including a sun gear, a casing, a rotatable carrier, an internal ring gear within the casing and constituting the outer member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; the external periphery of said ring gear having bearing engagement with the inner surface of said casing cylindrical wall over a narrow annular cylindrical contact area constituted by circumferentially continuous, smooth and uninterrupted cylindrical surfaces of said ring gear and said casing cylindrical wall, and which is axially substantially centrally of said ring gear and which has an axial extent substantially less than that of the teeth of said ring gear; said narrow annular cylindrical area comprising the interface between the radially outer smooth cylindrical surface of a central rib on the external periphery of said ring gear and the radially inner smooth cylindrical surface of a central rib on the inner surface of said casing cylindrical wall.

5. In a planetary gearing including a sun gear, a casing, a rotatable carrier, an internal ring gear within the casing and constituting the outer member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; the external periphery of said ring gear having bearing engagement with the inner surface of said casing cylindrical wall over a narrow cylindrical contact area constituted by circumferentially continuous, smooth and uninterrupted cylindrical surfaces of said ring gear and said casing cylindrical wall, and which is axially substantially centrally of said ring gear and which has an axial extent substantially less than that of the teeth of said ring gear; one of said circumferentially continuous, smooth and uninterrupted cylindrical surfaces of said narrow annular cylindrical area comprising the radially outer smooth cylindrical surface of a central rib extending integrally from the external periphery of said ring gear.

6. In a planetary gearing including a sun gear, a casing, a rotatable carrier, an internal ring gear within the casing and constituting the member of the gearing, and planet pinions rotatable on the carrier and meshing with the sun gear and ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; a narrow annular rib extending inwardly from the inner surface of said cylindrical wall and having a cylindrical radially inner surface, which is continuous, smooth and uninterrupted; a narrow annular rib extending centrally outwardly from the external periphery of said ring gear and having a cylindrical radially outer surface, which is continuous, smooth and uninterrupted in engagement with the radially inner surface of said first-named rib; the axial extent of said ribs being substantially less than that of the teeth of said ring gear, whereby said ring gear and said casing circumferential cylindrical wall are in supporting connection over a narrow annular cylindrical contact interface between said two ribs, constituted by circumferentially continuous, smooth and uninterrupted cylindrical surfaces.

7. In a planetary gearing included a sun gear, a casing, a rotatable carrier, an internal ring gear within the casing and constituting the member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; a narrow annular rib extending inwardly from the inner surface of said cylindrical wall and having a cylindrical radially inner surface; a narrow annular rib extending centrally outwardly from the external periphery of said ring gear and having a cylindrical radially outer surface in engagement with the radially inner surface of said first-named rib; the axial extent of said ribs being substantially less than that of the teeth of said ring gear whereby said ring gear and said casing circumferential cylindrical wall are in supporting connection over a narrow annular cylindrical interface between said two ribs; and retaining means laterally engaging both of said ribs and restraining said ring gear against axial displacement relative to said casing cylindrical wall.

8. In a planetary gearing including a sun gear, a casing, a rotatable carrier, an internal ring gear within the casing and constituting the member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; a narrow annular rib extending inwardly from the inner surface of said cylindrical wall and having a cylindrical radially inner surface; a narrow annular rib extending centrally outwardly from the external periphery of said ring gear and having a cylindrical radially outer surface in engagement with the radially inner surface of said first-named rib; the axial extent of said ribs being substantially less than that of the teeth of said ring gear whereby said ring gear and said casing circumferential cylindrical wall are in supporting connection over a narrow annular cylindrical interface between said two ribs; said first-named rib being formed with a plurality of radially extending bores therethrough at substantially uniformly spaced locations around its circumference, and said second-named rib being formed with a plurality of radial bores thereinto, each aligned with one of said first-named bores; and a plurality of pins each extending through a respective one of said first-named bores and into the aligned one of said second-named bores.

9. In a planetary gearing including a sun gear, a casing, a rotatable carrier, an internal ring gear within the casing and constituting the member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; a narrow annular rib extending inwardly from the inner surface of said cylindrical wall and having a cylindrical radially inner surface; a narrow annular rib extending centrally outwardly from the external periphery of said ring gear and having a cylindrical radially outer surface in engagement with the radially inner surface of said first-named rib; the axial extent of said ribs being substantially less than that of the teeth of said ring gear whereby said ring gear and said casing circumferential cylindical wall are in supporting connection over a narrow annular cylindrical interface between said two ribs; said first-named rib being formed with a plurality of radially extending bores therethrough at substantially uniformly spaced locations around its circumference, and said second-named rib being formed with a plurality of radial bores thereinto, each aligned with one of said first-named bores; a plurality of pins each extending through a respective one of said first-named bores and into the aligned one of said second-named bores; and means restraining radially outward movement of said pins.

10. In a planetary gearing including a sun gear, a casing, a rotatable carrier, an internal ring gear within the casing and constituting the member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; a narrow annular rib extending inwardly from the inner surface of said cylindrical wall and having a cylindrical radially inner surface; a narrow annular rib extending centrally outwardly from the external periphery of said ring gear and having a cylindrical radially outer surface in engagement with the radially inner surface of said first-named rib; the axial extent of said ribs being substantially less than that of the teeth of said ring gear whereby said ring gear and said casing circumferential cylindrical wall are in supporting connection over a narrow annular cylindrical interface between said two ribs; said first-named rib being formed with a plurality of bores extending radially therethrough at locations spaced uniformly circumferentially thereof, and said second-named rib being formed with a plurality of radial bores extending thereinto and each aligned with one of said first-named bores; a plurality of bushings each engaged in flush relation in a respective bore; a plurality of radial pins each extending through the bushings in a respective pair of aligned bores; and means for restraining said pins from displacement out of the respective bores.

11. In a planetary gearing including a sun gear, a casing, a rotatable carrier, an internal ring gear within the casing and constituting the member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; a narrow annular rib extending inwardly from the inner surface of said cylindrical wall and having a cylindrical radially inner surface; a narrow annular rib extending centrally outwardly from the external periphery of said ring gear and having a cylindrical radially outer surface in engagement with the radially inner surface of said first-named rib; the axial extent of said ribs being substantially less than that of the teeth of said ring gear whereby said ring gear and said casing circumferential cylindical wall are in supporting connection over a narrow annular cylindrical interface between said two ribs; said first-named rib being formed with a plurality of bores extending radially therethrough at locations spaced uniformly circumferentially thereof, and said second-named rib being formed with a plurality of radial bores extending thereinto and each aligned with one of said first-named bores; a plurality of bushings each engaged in flush relation in a respective bore; a plurality of radial pins each extending through the bushings in a respective pair of aligned bores; and means for restraining said pins from displacement out of the respective bores; each of said pins having a substantially reduced cross section at the junction of the two bores in which it is located whereby to provide for release of said ring gear to rotate relatively to said casing cylindrical wall upon the occurrence of overload on the planetary gearing.

12. In a planetary gearing including a sun gear, a casing, a rotatable carrier, an internal ring gear within the casing and constituting the member of the gearing, and planet pinions rotatable on the carrier and meshing with the sun gear and the ring gear: a supporting arrangement for said ring gear on said casing, normally restraining said gear against rotation relative to said casing while providing for relatively slight compensatory movements of said ring gear; said casing having a relatively thin cylindrical wall embracing said ring gear and having an axial extent very substantially greater than that of the teeth of said ring gear; a narrow annular rib extending inwardly from the inner surface of said cylindrical wall and having a cylindrical radially inner surface; a narrow annular rib extending centrally outwardly from the external periphery of said ring gear and having a cylindrical radially outer surface in engagement with the radially inner surface of said first-named rib; the axial extent of said ribs being substantially less than that of the teeth of said ring gear whereby said ring gear and said casing circumferential cylindrical wall are in supporting connection over a narrow annular cylindrical interface between said two ribs; said first-named rib being formed with a plurality of bores extending radially therethrough at locations spaced uniformly circumferentially thereof, and said second-named rib being formed with a plurality of radial bores extending thereinto and each aligned with one of said first-named bores; a plurality of bushings each engaged in flush relation in a respective bore; a plurality of radial pins each extending through the bushings in a respective pair of aligned bores; means for restraining said pins from displacement out of the respective bores; each of said pins having a substantially reduced cross section at the junction of the two bores in which it is located whereby to provide for release of said ring gear to rotate relatively to said casing cylindrical wall upon the occurrence of overload on the planetary gearing; and retaining means laterally engaging both of said ribs and restraining said ring gear against relative movement axially of said cylindrical wall of said casing.

13. In a planetary gearing including a sun gear, a casing, a rotatable carrier, an internal ring gear within the casing and constituting the member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; a narrow annular rib extending inwardly from the inner surface of said cylindrical wall and having a cylindrical radially inner surface; a narrow annular rib extending centrally outwardly from the external periphery of said ring gear and having a cylindrical radially outer surface in engagement with the radially inner surface of said first-named rib; the axial extent of said ribs being substantially less than that of the teeth of said ring gear whereby said ring gear and said casing circumferential cylindrical wall are in supporting connection over a narrow annular cylindrical interface between said two ribs; said second named rib being formed with a plurality of recesses therearound located at substantially equally spaced circumferential locations, and said first-named rib being formed with a plurality of radial extending bores therethrough each normally aligned with a respective recess; and spring pressed detent means positioned in each of said bores and each engaged in a respective recess, whereby to provide for release of said internal ring gear for rotation relative to said casing upon occurrence of overload of the planetary gearing.

14. In a planetary gearing including a sun gear, a casing, a rotatable carrier, an internal ring gear within the casing and constituting the outer member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; the external periphery of said ring gear having bearing engagement with the inner surface of said casing cylindrical wall over a narrow annular cylindrical contact area constituted by circumferentially continuous, smooth and uninterrupted cylindrical surfaces of said ring gear and said casing cylindrical wall, and which is axially substantially centrally of said ring gear and which has an axial extent substantially less than that of the teeth of said ring gear; the thickness of said cylindrical wall being less at locations outside of said bearing engagement than the thickness at said bearing engagement.

15. In a planetary gearing including a sun gear, a casing, a rotatable carrier, an internal ring gear within the casing and constituting the outer member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; the external periphery of said ring gear having supporting connection with the inner surface of said casing cylindrical wall over a narrow annular cylindrical area which is axially substantially centrally of said ring gear and which has an axial extent substantially less than that of the teeth of said ring gear; said narrow annular cylindrical area comprising a peripheral surface of an annular web having its outer periphery weld united to the inner surface of said casing cylindrical wall and its inner periphery weld united centrally to the external periphery of said ring gear.

16. In a planetary gearing including a sun gear, a casing, a rotatable carrier, an internal ring gear within the casing and constituting the outer member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; the external periphery of said ring gear having supporting connection with the inner surface of said casing cylindrical wall over a narrow annular cylindrical area which is axially substantially centrally of said ring gear and which has an axial extent substantially less than that of the teeth of said ring gear; said casing being pot-shaped and including a circular wall at one end thereof; said circular wall being formed with two series of concentric arcuate slots therein, the slots of each series having a different radius, and the slots of each series being staggered by 90°.

17. In a planetary gearing including a sun gear, a casing, a rotatable carrier, an internal ring gear within the casing and constituting the outer member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; the external periphery of said ring gear having supporting connection with the inner surface of said casing cylindrical wall over a narrow annular cylindrical area which is axially substantially centrally of said ring gear and which has an axial extent substantially less than that of the teeth of said ring gear; said casing being pot-shaped and including a circular wall at one end thereof; said circular wall being formed with two series of concentric arcuate slots therein, the slots of each series having a different radius, and the slots of each series being staggered by 90°; said circumferential wall being formed with two sets of axially adjacent circumferentially extending slots therein, between said bottom wall and said narrow annular cylindrical area, said circumferentially extending slots and the circumferentially slots in the two series being staggered by 90°.

18. In a planetary gearing including a sun gear, a casing, a rotatable carrier, an internal ring gear within the casing and constituting the outer member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; the external periphery of said ring gear having supporting connection with the inner surface of said cylindrical wall over a narrow annular cylindrical area which is axially substantially centrally of said ring gear and which has an axial extent substantially less than that of the teeth of said ring gear; said casing having a support zone at one end thereof, and said cylindrical wall being formed with two series of axially adjacent circumferentially extending slots, between said support zone and said narrow annular cylindrical area; the slots in the two series being staggered 90° circumferentially.

19. In a planetary gearing including a sun gear, a casing, a rotatable carrier, an internal ring gear within the casing and constituting the outer member of the gearing, and planet pinions rotatable on the carrier and meshing with the sun gear and the ring gear: a supporting arrangement for said ring gear on said casing, normally restraining said ring gear against rotation relative to said casing while providing for relatively slight compensatory movements of said ring gear; said casing having a relatively thin cylindrical wall embracing said ring gear and having an axial extent very substantially greater than that of the teeth of said ring gear; the external periphery of said ring gear having supporting connection with the inner surface of said casing cylindrical wall over a narrow annular cylindrical area which is axially substantially centrally of said ring gear and which has an axial extent substantially less than that of the teeth of said ring gear; said cylindrical wall being formed with two series of axially adjacent circumferentially extending slots therethrough, between said narrow annular cylindrical area and one end of said casing; a second casing surrounding said first-named casing in radially spaced relation thereto; and a radial web interconnecting the two casings only at such one end of said first-named casing.

References Cited by the Examiner

UNITED STATES PATENTS

| | | | |
|---|---|---|---|
| 2,591,734 | 4/1952 | Smith et al. | 74—411 X |
| 2,700,311 | 1/1955 | Bade | 74—410 X |
| 3,021,731 | 2/1962 | Stoeckicht | 74—411 X |
| 3,213,713 | 10/1965 | Sagara | 74—801 |

FOREIGN PATENTS

| | | |
|---|---|---|
| 734,223 | 7/1955 | Great Britain. |

DAVID J. WILLIAMOWSKY, *Primary Examiner.*

L. H. GERIN, *Assistant Examiner.*